Sept. 1, 1964 — H. HODKINSON — 3,146,861
AUTOMATIC ADJUSTING DEVICE
Filed Dec. 5, 1961 — 2 Sheets-Sheet 1

INVENTOR
Harold Hodkinson
by Benj. T. Rauber
attorney

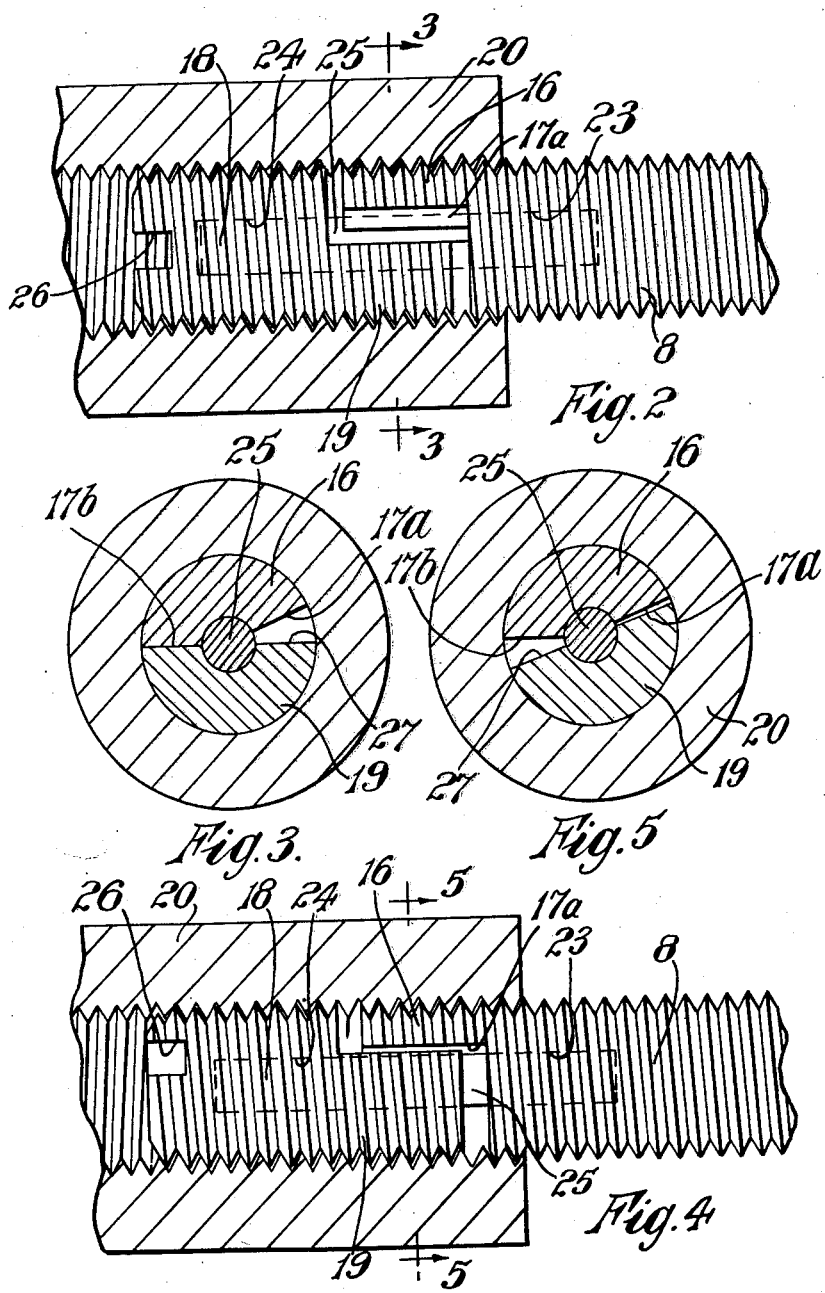

United States Patent Office 3,146,861
Patented Sept. 1, 1964

3,146,861
AUTOMATIC ADJUSTING DEVICE
Harold Hodkinson, Coventry, England, assignor to Dunlop Rubber Company Limited, London County, England, a British company
Filed Dec. 5, 1961, Ser. No. 157,169
Claims priority, application, Great Britain,
Dec. 16, 1960, 43,344/60
6 Claims. (Cl. 188—73)

This invention relates to automatic adjusting devices for brakes.

An object of the invention is to provide a brake comprising an adjusting device which will automatically compensate for wear.

According to the present invention a brake comprises an automatic adjusting device having three cylindrical members each provided with identical screw threads thereon, all of said members being disposed co-axially of each other and two of said members being rotatable over a limited angular distance relative to each other, both being threadably engaged by the third member.

Preferably the said automatic adjusting device comprises two members of identical diameter and thread, each having a projection from its end which is threaded on its cylindrical periphery, one having a projection of semi-circular cross-section and the other a projection of a minor sector cross-section, and an elongated nut adapted to thread on to both said members when the projections on the latter lie alongside each other.

The diametral surface of one projection is adapted to abut a radial surface of the other projection and in this position the threads on both members are in alignment and the nut is allowed to rotate and move along both members. When the nut is turned in an unscrewing direction one of the members is allowed to rotate with the nut over a limited angular distance until the threads on the members are moved out of alignment and the nut jams on both members.

By a minor sector cross-section we mean a cross-section in the shape of a sector wherein the angle between the bounding radii thereof is less than 180°. By diametral and radial surfaces we mean the surfaces formed when the diameter of the semi-circular cross-section and the radii of the minor sector cross-section respectively move axially over the length of the projection.

The invention will now be described with reference to the accompanying drawings of which:

FIGURE 2 is an enlarged sectional detail of the adjuster mechanism in one relative position of its component parts;

FIGURE 3 is a view on the section 3—3 of FIG. 2 looking in the direction of the arrows;

FIGURE 4 is a similar view of FIGURE 2 showing the adjuster mechanism in a different relative position;

FIGURE 5 is a view on the section 5—5 of FIG. 4 looking in the direction of the arrows;

Figure 1:
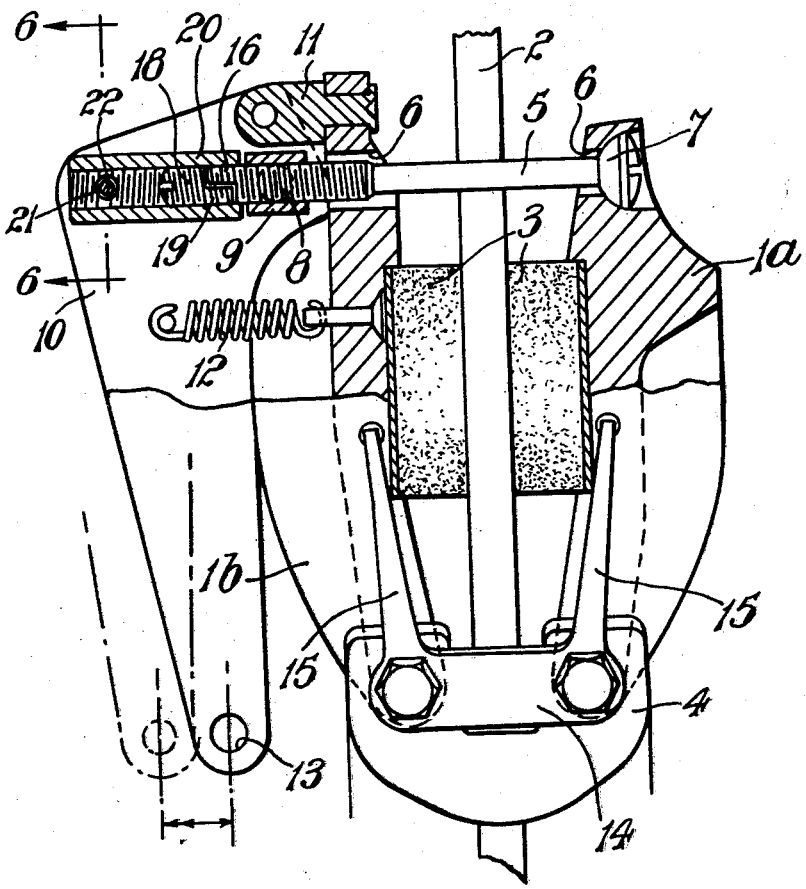
FIGURE 1 is a part-sectional view of one form of brake constructed according to the invention.

The disc brake illustrated in FIGURE 1 comprises a pair of pressure plates 1a and 1b disposed chordally on opposite sides of a brake disc 2 and having pads 3 of friction material associated therewith. Both plates 1a and 1b are pivotable each about an end on a non-rotatable part 4 of the brake structure. The plates 1a and 1b project beyond the outer periphery of the disc 2 and a tie rod 5 passes through holes 6 formed at their outer ends. The tie rod 5 has a head 7 which is located in a part-spherical recess in pressure plate 1a. The other end 8 of the tie rod 5 is threaded and is screwed through a trunnion block 9 trunnioned on an operating lever 10 which is bifurcated at this point.

A lug 11 is secured to the outer end of the pressure plate 1b adjacent the lever 10 for the purpose of providing a pivot for the lever. A return spring 12 is secured in tension between the lever 10 and pressure plate 1b. Actuating means such as a cable or rod may be attached to the end of the lever remote from the lug 11 at the hole 13.

A U-shaped member 14 having springy and deformable limbs 15 is secured to the non-rotatable part 4 and the ends of the limbs 15 engage the pressure plates 1a and 1b. As the friction pads 3 wear, the pressure plates move further towards the disc 2 and the limbs 15 progressively take on a permanent set but they still retract the pressure plates through a fixed distance after every brake application. The construction and operation of the U-shaped member is fully described in the specification of British Patent No. 883,417.

Angular movement of the lever 10 about the lug 11 causes the pressure plate 1b to move angularly towards the disc 2 while the opposite pressure plate 1a is drawn towards the disc by the rod 5. The disc 2 is then engaged frictionally by the pads 3 associated with the pressure plates.

After passing through the trunnion block 9 the end 8 of the tie rod 5 extends away from the disc 2 and is provided at its extreme end with a projection 16. The projection 16 has the cross-section of a sector of a circle the angle between the bounding radii 17a and 17b (FIGURES 2, 3, 4 and 5) being of the order of 155°. A grub screw 18 having a diameter and external thread identical with those of the screw 8 and projection 16 is also provided with a projection 19 having a semi-circular cross-section at one end. The axial lengths of the projections 16 and 19 are substantially the same. An elongated nut 20 is screwed to both the end 8 of the tie rod 5 and the grub screw 18 so that the projections 16 and 19 lie alongside each other and so that they are allowed a slight angular displacement relative to each other by virtue of the sector cross-section of the projection 16.

Figures 6, 7:
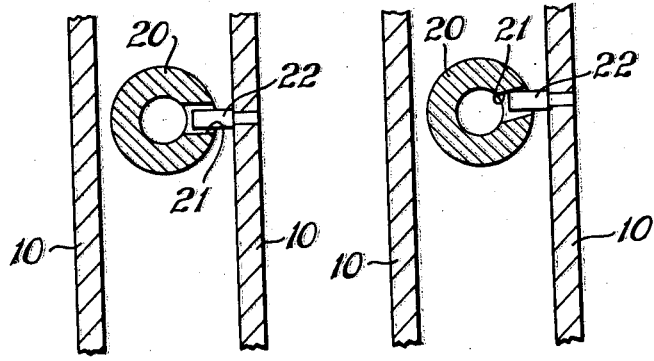
FIGURE 6 is a section on line 6—6 of FIG. 1 showing a first position of the connection between the brake operating lever and an element of the adjusting mechanism.
FIGURE 7 is a view similar to FIG. 6, but showing a second position of the connection between the brake operating lever and an element of the adjusting mechanism.

A hole 21 is formed in the remote side of the nut 20 as seen in FIGURES 1, 6 and 7 and a pin 22 secured to the adjacent side of the lever 10 projects into the hole 21. Thus angular movement of the lever in a brake-applying direction causes the pin 22 to move upwards and to impart a clockwise motion to the nut 20 when viewed from the left-hand side of the brake as shown in FIGURE 1.

Axially extending blind holes 23 and 24 are formed in alignment with each other in the end 8 and the grub screw 18 respectively and a dowel pin 25 is located in both holes to preserve the axial alignment of the end 8 and grub screw 18 on assembly of the adjuster. A slot 26 for a screwdriver is provided on the other end of the grub screw 18.

When the nut 20 is turned in a clockwise direction due to brake applying movement of the lever 10 the grub screw 18 rotates with it until diametral surface 27 and the radial surface 17b abut. In this abutting position the threads on both grub screw 18 and end 8 of the tie rod 5 are in alignment. This is shown in exaggerated form in FIGURE 2 where the threads of both grub screw 18 and end 8 are in abutment with the face of the thread of the nut 20 which is presented towards the left as shown in FIGURE 2. There must be a small clearance between the end of the projection 16 and the grub screw 18 and between the projection 19 and end 8 to permit the surfaces 17b and 27 to abut. Further rotation of the nut 20 in a clockwise direction enables it to move along both grub screw and end 8 as if it were moving along a continuously threaded continuous bolt. It can be arranged that the amount the nut 20 moves before the surfaces 17b and 27 abut is related to the angular movement the lever 10 has to travel before the pads 3 are in contact with the disc 2. This can be done by varying the angle of the sector. Movement of the lever 10 in excess of this amount means that the nut 20 will be repositioned on both the grub screw 18 and the end 8.

When the lever 10 is released the nut 20 turns in an anti-clockwise direction and the grub screw 18 turns with it and in doing so moves axially away from the end 8. The threads on the grub screw 18 and end 8 thus move out of alignment with each other and when the running tolerance between the nut 20 and the end 8 is taken up the nut 20 will jam on the end 8 and on the grub screw 18 and will not turn any further in an anti-clockwise direction without rotating the tie rod 5 with it. When the jamming does take place the diametral surface 27 of the grub screw projection 19 must not come into abutment with the radial surface 17a on the projection 16. If these two surfaces do abut no effective jamming can take place because the grub screw 18 and end 8 are prevented from moving further apart. The angle of the sector is so chosen that this does not happen and is governed largely by the running tolerance between the nut 20 and the grub screw 18 and end 8. The jamming of the nut 20 is illustrated in FIGURE 4 and it will be seen that the threads on the grub screw 18 and end 8 have moved to abut opposite faces of the thread of the nut 20.

Thus when the nut rotates due to further movement of the lever 10 in the brake release direction the nut 20 will, if it has been repositioned on the end 8 of the tie rod 5, rotate the latter causing it to move axially through the trunnion block 9 thus shortening its effective length i.e. the distance between the head 7 and the trunnion block 9, to compensate for wear of the pads 3.

When the pads 3 are worn and need renewal the brake can be reset by turning the grub screw 18 by means of the screw-driver slot 26 in a clockwise direction thus rotating both grub screw 18 and tie rod 5. This opens up the pressure plates and allows removal of the old pads and insertion of new ones.

The advantage of the brake having the present adjuster incorporated therewith is that adjustment can take place in large steps, as on the first few applications to set the brake initially, and subsequently the adjustment can take place by infinitely small increments during normal operation of the brake.

References to clockwise and anti-clockwise in the foregoing description may be interchanged when an adjuster with opposite hand characteristics is fitted. Furthermore the sector shaped projection may be provided on the grub screw if this is more convenient.

The adjuster is of a convenient size and shape to be completely enclosed by a dirt excluding boot.

Having now described my invention, what I claim is:

1. An automatic brake adjusting device comprising two members having co-axially aligned cylindrical external surfaces of equal diameter threaded with threads of identical pitch, each said member having a projection extending in overlapping relation to the projection of the other member, the projection of one member being semi-circular in cross section and the other having a minor sector cross section, and a nut engaging the threads of both members when the projections on the latter lie alongside each other, wherein the threads on both members are in alignment when the diametral surface of one projection is in abutment with one radial surface of the other projection allowing the nut to rotate relative to said members in one direction and wherein on movement of the nut in the opposite direction the threads on both members move out of alignment and eventually jam the nut on both members so that all three rotate together.

2. The brake adjusting device of claim 1 comprising means to engage said nut to a brake applying element to rotate said nut on the threaded surfaces of both said members in one direction and upon reverse movement beyond an initial limit to rotate both said members.

3. An automatic brake adjusting device comprising a tie rod for connection to a brake element, said tie rod having a cylindrical threaded outer surface at one free end and a part cylindrical threaded section projecting beyond the end of said threaded surface, an internally threaded member threaded on said threaded cylindrical portion of said tie rod for attachment to another brake element, a screw having a cylindrical surface co-axially aligned with the said tie rod and having a screw thread of the same diameter and pitch as the screw threads of said tie rod and having a projection overlapping the projection of said tie rod, the total circumference of the threaded projections of said tie rod and said screw being less than a complete circle and said projections having flat, radial, opposed surfaces, and a nut threaded onto the threaded surfaces of said tie rod and screw and rotatable in reverse directions by a brake applying element, the tolerance between the threads of the nut and the threads of the tie rod and screw being sufficient to permit said nut to rotate on said screw to bring the threads of said screw out of alignment with the threads of the tie rod before the radial faces of said screw and tie rod projections contact thereby causing said tie rod to rotate in said internally threaded member.

4. The adjusting device of claim 3 in which said screw may be rotated with said tie rod free of said nut and said internally threaded member.

5. The adjusting device of claim 4 in which said screw is a grub screw having a recess for engagement by a tool to rotate it free from said nut.

6. The adjusting device of claim 3 in which one of said projections is of semi-cylindrical cross section with a diametral face and the other is of a cross section having faces forming a di-hedral angle of less than 180° and an arc of a circle of less than 180°.

References Cited in the file of this patent

UNITED STATES PATENTS

| 1,446,702 | Hiscutt | Feb. 27, 1923 |
| 2,276,206 | Klaue | Mar. 10, 1942 |
| 2,867,295 | Butler | Jan. 6, 1959 |

FOREIGN PATENTS

| 203,019 | Great Britain | Sept. 3, 1923 |
| 747,974 | Great Britain | Apr. 18, 1956 |
| 813,316 | Great Britain | May 13, 1959 |
| 1,241,774 | France | Aug. 16, 1960 |
| 1,246,519 | France | Oct. 10, 1960 |